United States Patent [19]
Yamashita et al.

[11] Patent Number: 5,464,576
[45] Date of Patent: Nov. 7, 1995

[54] METHOD OF MAKING ISOTROPIC BONDED MAGNET

[75] Inventors: Fumitoshi Yamashita, Ikoma; Masami Wada, Hirakata, both of Japan

[73] Assignee: Matsushita Electric Industrial Co., Ltd., Japan

[21] Appl. No.: 875,290

[22] Filed: Apr. 29, 1992

[30] Foreign Application Priority Data

| Apr. 30, 1991 | [JP] | Japan | 3-128666 |
| Oct. 25, 1991 | [JP] | Japan | 4-279237 |
| Jan. 22, 1992 | [JP] | Japan | 4-008966 |

[51] Int. Cl.$^6$ .................................................. H05B 1/00
[52] U.S. Cl. ........................ 264/428; 148/101; 148/105
[58] Field of Search .................. 264/27, 24, 22, 264/122, 125, DIG. 58, 25, 26; 419/10, 19, 44; 148/105, 101, 108

[56] References Cited

U.S. PATENT DOCUMENTS

| 4,360,382 | 11/1982 | Iijima et al. | 419/19 |
| 4,600,555 | 7/1986 | Shimizu | 419/44 |
| 4,767,474 | 8/1988 | Fujimura et al. | 148/302 |
| 4,840,684 | 6/1989 | Fujimura et al. | 148/302 |

*Primary Examiner*—Christopher A. Fiorilla
*Attorney, Agent, or Firm*—Wenderoth, Lind & Ponack

[57] ABSTRACT

A method of manufacturing an inorganic bonding type rapidly solidified magnet, which is formed by energizing and sintering, after an instantaneous mutual attractive force has been applied intermittently in accordance with the electromagnetic force upon a thin piece shaped rapidly solidified magnet powder in a mold. A thin piece shaped inorganic glass having a thermal expansion ratio $9\times10^{-6}/°$ C. or less is used as the inorganic coupling agent. The magnet of the present invention having a ring shape, is effective to improve reliability as a rotor magnet in consideration of size, safety, mechanical strength, etc. of the present magnet formed in a ring shape. The electric resistance of the magnet is $10^{-3}$ through $10^{-1}$ $\Omega$cm and is desirable as a rotor magnet of a PWM driving brushless electric motor.

4 Claims, 3 Drawing Sheets

5 pressurizing source
6b direct current constant current power source
6a direct current pulse power source

METHOD OF MAKING ISOTROPIC BONDED MAGNET

BACKGROUND OF THE INVENTION

The present invention generally relates to a method of making an inorganic bonding type rapidly solidified magnet by an energizing, sintering method, and a magnet rotor therefrom.

A rare earth—iron system rapidly solidified magnet is reported in, for example, a published paper, "Rare earth—Iron—Boron Materials; A new Era in Permanent Magnets" Ann. Rev. Sci., Vol. 16, p. 467–485 (1986) by J. F. Herbest and others.

According to the above described papers, an alloy molten bath including a rare earth element R, a representative transition metal element Fe/Co and B at a ratio near 2:14:1 provides a continuous splat from melt spinning, which is a rapidly solidified magnet thin piece having a microscopic structure with an $R_2Tm_{14}B$ phase (where R is Nd/Pr, Tm is Fe/Co) of 20 through 400 nm at approximately 580° C. in crystallizing temperature, dispersed in an amorphous Fe phase. The rapidly solidified magnet thin piece is magnetically isotropic. The representative magnet characteristic is a specific coercive force where Hcj<8 kOe and a residual magnetization $4\pi Ir \approx 8$ kG. But the material shape to be obtained from continuous splat quenching is restricted to a thin belt, thin piece or the like. Accordingly, to provide a magnet which can be employed as an electric motor, the operation for converting the material form, namely, fixing the powder of the rapidly solidified magnet thin piece by some method is necessary.

Although the fundamental fixing method in powder metallurgy is pressureless sintering, it is necessary to retain Hcj in accordance with the microscopic construction, so that the pressureless sintering of the rapidly solidified magnetic powder is hard to effect. As disclosed in, for example, U.S. Pat. No. 4,689,163 and U.S. Pat. No. 4,981,635, a resin bonded type rapidly solidified magnet for fixing the melt spun powder with resin is used to form a magnet for an electric motor. Hcj which can fix, under the crystallizing temperature or lower, the melt spun powder, remains basically invariable. But the resin bonding type rapidly solidified magnet is difficult to make with a density of $6g/cm^3$ or more and is restricted to $4\pi Ir \leq 6.2$ kG.

There is a fixing method for rapidly filling a solidified magnetic powder into a mold so as to effect compression at the crystallizing temperature or greater, for accompanying plastic deformation. According to such method, the rapidly solidified magnet is made higher in density, i.e. near to the true density of the rapidly solidified magnet thin piece, while the level of the Hcj is retained to some extent. The rapidly solidified magnet is $4\pi Ir \leq 8.4$ kG. If the rapidly solidified magnet is further deformed in plasticity, the magnetic anisotropy is caused according to the extent of distortion and becomes $4\pi Ir \geq 8.4$ kG or more. Generally, a high frequency inductive heating operation of a mold is effected as a heating system to indirectly heat the melt spun powder in the mold. This method is not suitable for production on an industrial scale of a rapidly solidified magnet, because it takes more time to heat and cool the mold.

The rapidly solidified magnet with a rapidly solidified magnet powder having been energized and sintered in the mold, makes it possible to provide a near net shape with quick heat and a magnet of $4\pi Ir \leq 8.4$ kG having a higher mechanical strength, with advantage, in an industrial scale operation.

In order to effect an energizing, sintering operation, the compression pressure of $\leq 200$ kg/cm² is applied to the melt spun powder in the mold, a current of 200–500 A/cm² is fed to directly heat the rapidly solidified magnetic powder to deform it in plasticity at the crystallizing temperature or more, for making it minute. When an energizing operation is effected on a rapidly solidified magnetic powder (ring shaped) in the mold type formed into a ring shape, each portion in the peripheral direction of the ring shape may cause local current concentration without becoming equal in current density. Although the local current concentration difference has an effect on the surface condition of each thin piece construction of the melt spun powder, it is difficult to uniformly fill the melt spun powder into the mold formed in a ring shape.

When the local current concentration is caused in such ring-shaped peripheral direction as described hereinabove, the difference in the temperature rise of the melt spun powder is caused in accordance with the concentration. If the current concentration is slight, the temperature difference thereof is expanded together with the passage of the energizing time. The difference becomes largest at the highest temperature reached immediately after the energization current interruption. The temperature difference acts, in other words, to impart a difference in the roughness in the $R_2Tm_{14}B$ phase. It means Hcj if the difference in $4\pi Ir$ is slight in terms of the magnetic characteristics of the peripheral direction of the ring shaped magnet made minute, and change in the temperature factor of Hcj. When the extent of the current concentration is great, the mold itself breaks due to the temperature difference, so that a rapidly solidified magnet cannot be manufactured.

The Hcj level of the rotor magnet of the electric motor has an important influence on the reliability of the electric motor, such as demagnetizing proof force with respect to the reverse magnetic field by the excitation of the stator winding, and the temperature factor of the Hcj does demagnetizing proof force with respect to the temperature rise to be accompanied by the operation. Accordingly, the Hcj and the temperature factor of the Hcj must not change in the ring shaped peripheral direction. Further, when a brushless electric motor is driven in PWM, the high frequency magnetic field from the stator side corresponding to the carrier frequency is interlinked with a rotor magnet so as to generate eddy currents corresponding to the electric resistance of the rotor magnet. The loss caused by the eddy current raises the magnetic temperature so as to lower the output of the electric motor and the efficiency. For higher output and higher efficiency of such an electric motor, an effective rotator magnet higher in residual magnetization and higher in electric resistance is required.

A resin bonding type rapidly solidified magnet is employed in a magnet rotor (for example, U.S. Pat. No. 4,689,163 and U.S. Pat. No. 4,981,635). The resin bonding type rapidly solidified magnet has $4\pi Ir \leq 6.2$ kG and an electric resistance of $10^{-4}$–$10^{-1}$ Ωcm.

The energized, rapidly sintered solidified magnet has a $4\pi Ir > 6.2$ kG and electric resistance $10^{-4}$ Ωcm (close to $10^{-5}$ Ωcm).

Accordingly, a higher $4\pi Ir$ is obtained as compared with the resin magnet, but the electric resistance is low. Also, when tens to hundreds of watts from of rotator magnets are provided, the compression direction distance generally becomes longer. As the rapidly solidified magnetic powder is low in electric resistance, the energizing, sintering operation becomes difficult to effect as the compression direction distance becomes longer.

A ferrite sintered magnet has $4\pi Ir \leq 4.2$ kG, electric resistance $>10^4$ $\Omega$cm, and is lower in $4\pi Ir$ as compared with the resin bonding type rapidly solidified magnet. Also, a rare earth cobalt system sintered magnet (SmCo$_5$) has $4\pi Ir \geq 8$ kG, electric resistance $10^{-5}$ cm and is lower in electric resistivity as compared with resin bonding type rapidly solidified magnet.

As described hereinabove, a magnet which is superior in matching property between the $4\pi Ir$ and the electric resistance suitable for a rotor magnet of, for example, a PWM driving brushless electric motor has, under the existing circumstances, a ferrite sintering magnet, and more preferably, $4\pi Ir$ higher than it, is a resin bonding rapidly solidified magnet having comparatively high electric resistance. Generally these magnets dispose a non-magnetic reinforcing member in a magnetic circuit gap when necessary from the viewpoint of reliability in practical use, given the size, safety and the mechanical strength and so on of the magnetic rotor.

SUMMARY OF THE INVENTION

Accordingly, the present invention has been developed with a view to substantially eliminating the above discussed drawbacks inherent in the prior art, and has for its essential object to provide a method for making an inorganic bonding type rapidly solidified magnet, and to make a magnet rotor thereof.

Another important object of the present invention is to provide a method for making an inorganic bonding type rapidly solidified magnet by an energizing, sintering operation after intermittently effecting an instantaneous mutual attractive force in accordance with the electromagnetic force upon the rapidly solidified magnetic powder in the mold.

Especially, a thin piece shaped glass is used in the inorganic bonding agent, and the thermal expansion coefficient of the inorganic bonding agent is $\leq 9 \times 10^{-6\circ}$ C.$^{-1}$ to improve reliance as a rotor magnet in consideration of size, safety, mechanical strength, etc. of the present magnet formed in a ring shape. The electric resistance $10^{31\ 3}$ to $10^{-1}$ $\Omega$cm is preferred for the rotor magnet of the PWM driving brushless electric motor.

The principle component of the thin piece for constituting the rapidly solidified magnetic powder of the present invention, is a continuous splat from quenching of an alloy molten bath including a rare earth element R and a transition metal element Fe and B at a ratio near 2:14:1. The rapidly solidified magnet thin piece assumes a minute structure and is magnetically isotropic with $R_2Tm_{14}$ compound (R is Nd/Pr, Tm is Fe/Co) of 400 nm or lower as a major phase. The material shape is a variable thin piece of 20 to 30 μm or so. Grain growth in the main phase may be restrained by an additive element. Elements (Zn, Al, Si, Nb, Ta, Ti, Zr, Hf, W and so on) for increasing the Hcj may be used within the range where $4\pi Ir$ is not to be lowered.

As the inorganic bonding agent used in the present invention, there can be enumerated inorganic glasses including borosilicate glass, aminoborosilicate glass and inorganic glass including the other MgO, ZrO, PbO, BaO, CaO and so on as representative.

The shape of such an inorganic bonding material is preferably variable in the thin piece of, for example, 4 μm or so in thickness. These inorganic bonding agents can be adhered on the melt spun powder. A concrete means is not specified, but observes an established rule. When, for example, inorganic salts are adhered and hardened on the melt spun powder, metallic oxides such as Mg, Al, Zr and so on, or salts are added while the rapidly solidified magnet powder is dispersed into a water system medium in which inorganic salts are dissolved in advance. In the case of absorption, the inorganic glass of 0.1 to 5 μm in grain diameter is directly mixed with the melt spun powder, or the inorganic glass is made into a slurry in advance with celluloses, butylcarbinol etc. The slurry and the rapidly solidified magnet powder are mixed and are dried. When the sol gelation reaction is used, metallic alkyds such as silicate, titanate, aluminate, zirconate etc. having alkyl radicals corresponding to the glass composure is made into a sol in alcohol/aqueous solvent and is dried while the melt spun powder is being dispersed in the sol. The sol on the melt spun powder surface is made porous by hydrolysis and dehydration condensation.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
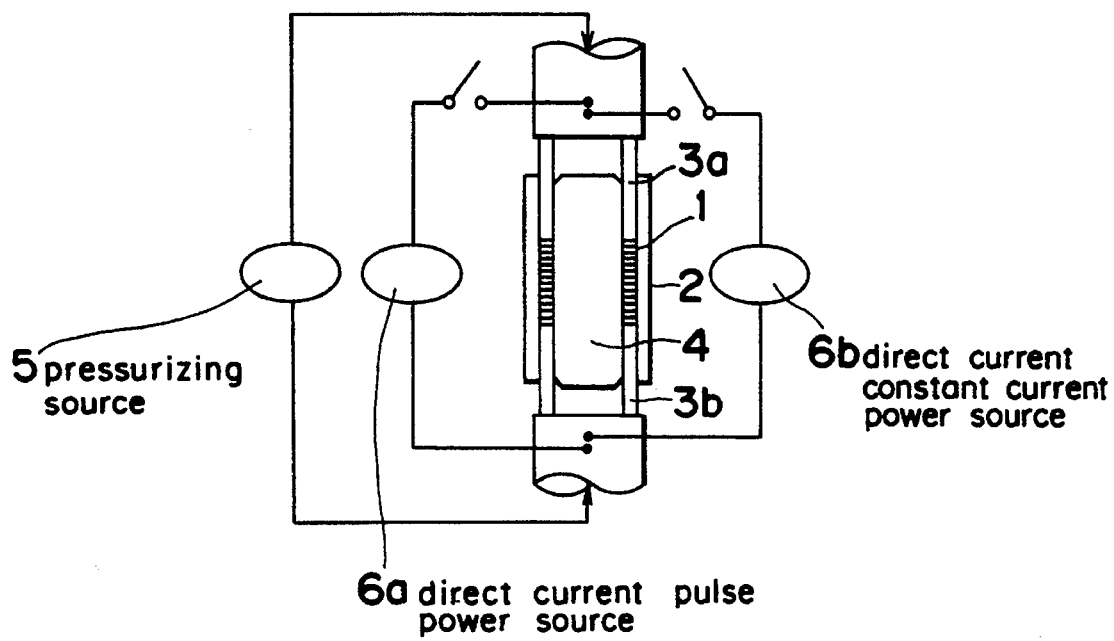
FIG. 1 is a block diagram of the essential portions showing an energizing, sintering apparatus to be used in a method of the present invention.

Before the description of the present invention proceeds, it is to be noted that like parts are designated by like reference numerals throughout the accompanying drawings.

The energizing, sintering operation of the present invention will be described with reference to the drawings.

Referring now to the drawings, there is shown in FIG. 1, a sectional view of essential portions showing the construction of an energizing, sintering apparatus according to one preferred embodiment of the present invention, which includes an inorganic bonding agent/rapidly solidified magnet powder 1, a die 2, a pair of electrodes 3a, 3b corresponding to the die 2, a core 4, a pressure system 5 for constant load, a power supply 6a for intermittently operating and rearranging by instantaneous mutual attractive force caused by electromagnetic force on each thin piece which composes the inorganic bonding agent/rapidly solidified magnet powder. Such electromagnetic force is produced by a direct current pulse current power source, a power supply 6b for generating Joule heat in the inorganic bonding agent/ rapidly solidified magnetic powder in the direct current constant current power supply, the power supply 6a, 6b being electrically connected with the pressure shaft rod of pressure system. The die material is preferably silicon nitride or Sialon, the electrode is super hardened alloy (for example, JIS H5501; G5), and the core is preferably a super hardened alloy (for example, JIS H5501; G9).

An energizing sintering step will be described in accordance with FIG. 1.

Compression by a constant load of $\geq 200$ kg/cm$^2$ is applied to the melt spun powder 1 through a pair of electrodes 3a, 3b. The instantaneous mutual attractive force in accordance with the electromagnetic force is applied to the inorganic bonding agent/rapidly solidified magnet powder 1 so as to effect rearrangement by cohesion.

Figure 2:
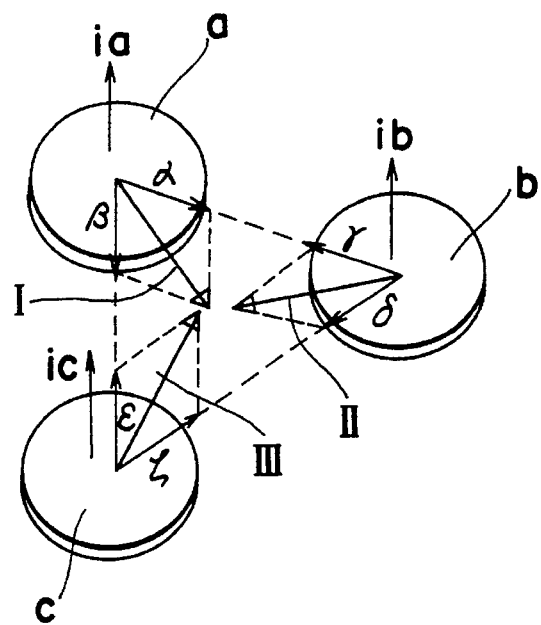
FIG. 2 is a vector diagram showing the mutual attractive forces on a thin piece.

The above described rearrangement can be as described hereafter. An inorganic bonding agent/rapidly solidified magnet powder 1 in the mold type is in a ring shape (cylindrical shape). As a pulse current flows in a direction along the ring shaped central shaft through a pair of electrodes 3a, 3b, a force moving towards the central shaft, namely, a cohesive force is applied to each thin piece which composes the inorganic bonding agent/rapidly solidified magnet powder 1. In further description, suppose that the current has flowed in parallel to two conductor lines, then the normally equal attractive force is applied between the lines by Biot-Savart's law and Fleming's law. Into optional thin plates a, b, c which compose the inorganic bonding agent/rapidly solidified magnet powder of FIG. 2, a pulse current in a direction from the reverse side to the surface side through a drawing in them penetrates and the mutual attractive forces are applied upon each thin plate. If the strength of the forces are shown with vectors of $\alpha, \beta, \tau, \delta, \epsilon, \zeta$, these resultant forces can be expressed with vectors such as I, II, III. Namely, all the resultant forces of the mutual attractive force by pulse currents applied to many thin plates which compose the inorganic bonding agent/rapidly solidified magnet powder, are directed towards the central shaft. When the instantaneous mutual attractive force from the pulse current is intermittently applied, it results in the rearrangement of each thin piece of the inorganic bonding agent/rapidly solidified magnet powder 1. The rearrangement contributes to the unification of the thin plate distribution in the peripheral direction of a mold type cavity formed in a ring shape. When a current is applied by a direct current constant current power supply 6b to the inorganic bonding agent/rapidly solidified magnet powder 1 in the cavity uniform in the peripheral direction of ring shape in such thin piece rearrangement as described hereinabove, the current flows through the whole thin piece construction. Although the mutual attractive force (electromagnetic force) is continuously applied among the whole component thin pieces, the resultant force of all the mutual attractive forces has a centripetal effect, moving towards the central shaft of the current flowing through the whole component thin piece so that the Joule heat is uniformly accumulated. The above described Joule heat is accumulated evenly in each portion of the mold type. The Joule heat is proportional to both the square of current density $\Delta I$ and electric resistance $\epsilon$, and the ratio $\epsilon/sc$ of volume of specific heat. When the inorganic bonding agent/rapidly solidified magnetic powder is heated under compression by a constant load load, it is made uniformly minute. When the current is cut off, the inorganic bonding agent/rapidly solidified magnet powder 1 becomes a rapidly solidified magnet in which the change in Hcj in the peripheral direction of the ring shape can be neglected. It is desired that the highest temperature reached by the energization is $\leq 750°$ C. The inorganic bonding type rapidly solidified magnet energized and sintered as hereinabove, hardly has a gap therein. The mechanical strength and the size accuracy is three or more times greater than the resin bonding type rapidly solidified magnet.

Embodiment 1

A rapidly solidified magnet powder of 53 to 350 μm was used with an indefinite thin strap of 30 μm or so in thickness smashed to pieces, being melt spun from a mother alloy of $Nd_{13}Fe_{68}Co_{18}B_6$ in alloy composition.

An energized rapidly solidified, sintered magnet was provided by filling the rapidly solidified magnetic powder into an energizing, sintering apparatus as depicted in FIG. 1. The mold was composed of a Sialon die of ϕ55 mm in outside diameter of ϕ inner 45 mm×70 mm h in inside diameter as in the resin bonding type rapidly solidified magnet, super hardened alloy core (JIS H5501;G5) of ϕ38 mm×70 mm h in outside diameter, a pair of super hardened alloy electrodes (JIS H5501;G5) of ϕ5 mm in outside diameter/ϕ38 mm×30 mm h in inside diameter.

Compression of the constant load was applied to the melt spun powder of 75 g through the electrode, pulse current (200 ms on-200 ms off) was energized, thereafter a ring shaped rapidly solidified magnet was provided through the continuous energizing operation. The size accuracy of the obtained rapidly solidified magnet was ϕ45.00±0.01 mm in outside diameter/ϕ38.00 mm±0.01 mm in inside diameter with radial direction 4πIr being 7.4 to 7.6 kG.

Table 1 shows the above described energizing, sintering conditions and the level of the peripheral direction Hcj value of the rapidly solidified magnet. The Hcj value cut the central portion in the compression direction equally divided by a ring shaped 12/360° and obtained by a VSM (sample vibration type magnetometer) which was 50 kOe pulse magnetized in the radial direction. The Hcj value showed the maximum value and the minimum value in the peripheral direction, and the difference thereof. The influence upon the mold in the repeated energizing, sintering operation is set forth in the remarks column.

TABLE 1

| | Primary Pulse curr. press. dens./time | | | Energ. Second. current press. dens. time | | | HcjKOe(n = 12) | | | Remarks |
|---|---|---|---|---|---|---|---|---|---|---|
| | kg/cm$^2$ | A/cm$^2$ | s | A/cm$^2$ | s | kg/cm$^2$ | max | min | max − min | |
| *1 | 250 | 65 | 30 | 480 | 320 | 500 | 16.2 | 16.5 | 0.3 | no die damage |
| *2 | 250 | 110 | 30 | 480 | 320 | 500 | 16.9 | 16.6 | 0.3 | no die damage |
| *3 | 250 | 150 | 30 | 480 | 320 | 500 | 17.1 | 16.6 | 0.5 | no die damage |
| *4 | 250 | 200 | 30 | 480 | 320 | 500 | 17.0 | 16.5 | 0.5 | no die damage |
| *5 | 500 | 200 | 30 | 480 | 380 | 500 | 17.1 | 16.7 | 0.4 | no die damage |
| **1 | 250 | — with 6 shots | 0 | 350 | 450 | 500 | 16.6 | 13.7 | 2.9 | die damage |
| **2 | 250 | — | 0 | 390 | 430 | 500 | 16.2 | 13.0 | 3.2 | die damage |

TABLE 1-continued

| Primary Pulse curr. press. dens./time | | | Energ. Second. current press. dens. time | | | HcjKOe(n = 12) | | | Remarks |
|---|---|---|---|---|---|---|---|---|---|
| kg/cm² | A/cm² | s | A/cm² | s | kg/cm² | max | min | max − min | |
| with 5 shots | | | | | | | | | |

Note:
*are examples according to the present invention
**are examples for the comparison purpose.

As is clear from the table, the rearrangement of each thin piece construction of the melt spun powder occurs when the instantaneous mutual attractive force is intermittently effected by the pulse current. The unification of the peripheral direction current distribution of the mold type formed into the ring shape by it is caused so as to flow the electric current in the continuous energization through the whole component thin plate. Therefore, the regeneration of the Joule heat in the peripheral direction of the melt spun powder is also uniform. As a result, as it can be possible to increase the current density of the continuous energization, a faster energizing, sintering operation can be effected. Also, by the increase in the electric resistance of the melt spun powder with inorganic bonding agent, it is possible to effect the fast energizing and sintering operation by accelerating operation of the temperature rise by the energization.

Embodiment 2

A rapidly solidified magnet powder of 53 through 350 μm forming a thin strap of 30 μm or so in thickness was smashed to pieces. Said powder had been formed from a melt spun mother alloy of $Nd_{13}Fe_{68}Co_{18}B_6$ in composition. The melt spun powder was mixed with an epoxy resin of 3 wt % and subjected to a compression operation at 10 tons/cm² pressure. Thereafter, a ϕ 20 mm×8 mm h resin bonding type rapidly solidified magnet of 6.30 g/cm³ is obtained by a resin hardening operation. Hcj at the time of the 50 kOe pulse magnetizing time of the magnet was 18.5 kOe, 4πIr was 6 kG.

Continuously, a glass thin piece of 4 μm or so in thickness was mixed in an optional amount with the melt spun powder as an inorganic bonding agent. The composition of the employed glass thin piece is $SiO_2$ 52 wt%, $Al_2O_3$ 16 wt%, CaO 15 wt%, MgO 5 wt %, $B_2O_3$ 10 wt % ZnO 2 wt % with the true density being 2.52 g/cm³, electric resistance $10^{13}$ Ω.

The above described rapidly solidified magnet powder and the inorganic bonding agent was filled into a mold having a Sialon die of ϕ26 mm in outside diameter/ϕ20 mm×40 mm h in inside diameter and super hardened alloy made electrode of ϕ20 mm×5 mm h by amount for becoming a magnet of constant volume (ϕ20 mm× 8 mm h). After a pulse current (200 ms On-200 ms Off) has been energized, the current was flowed continuously to provide a ring shaped inorganic bonding type rapidly solidified magnet (ϕ20 mm ×8 mm h). The magnet had a size accuracy of ϕ20±0.01 mm×8.0 ±0.05 mm.

Figure 3:
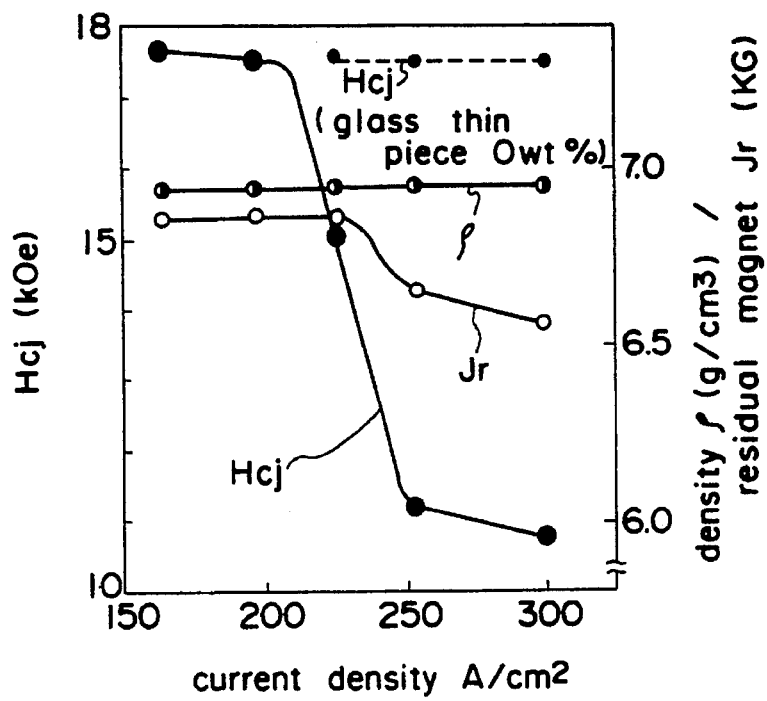
FIG. 3 is a characteristic view showing a current density dependence property of Hcj, residual magnetization, density.

Hcj and 4πIr of the above described inorganic bonding type rapidly solidified magnet was obtained with RFM, and the density was obtained by Archimedian law. FIG. 3 is a characteristic chart for comparing the relation of Hcj, residual magnetization and density with the inorganic bonding agent 0 wt % magnet Hcj, at the 50 kOe pulse magnetizing time with respect to the current density during magnet manufacture, including the inorganic bonding agent 6 wt % in the above described magnet. The density of the magnet exceeds 200 A/cm² in current density in spite of the fact that constant density, Hcj and 4πIr are greatly lowered. In the inorganic bonding agent 0 wt % magnet, Hcj is not lowered even at 300 A/cm². The Hcj and the 4πIr reduction under the constant density suggests the electric resistance increase of the inorganic bonding type magnet.

Figure 4:
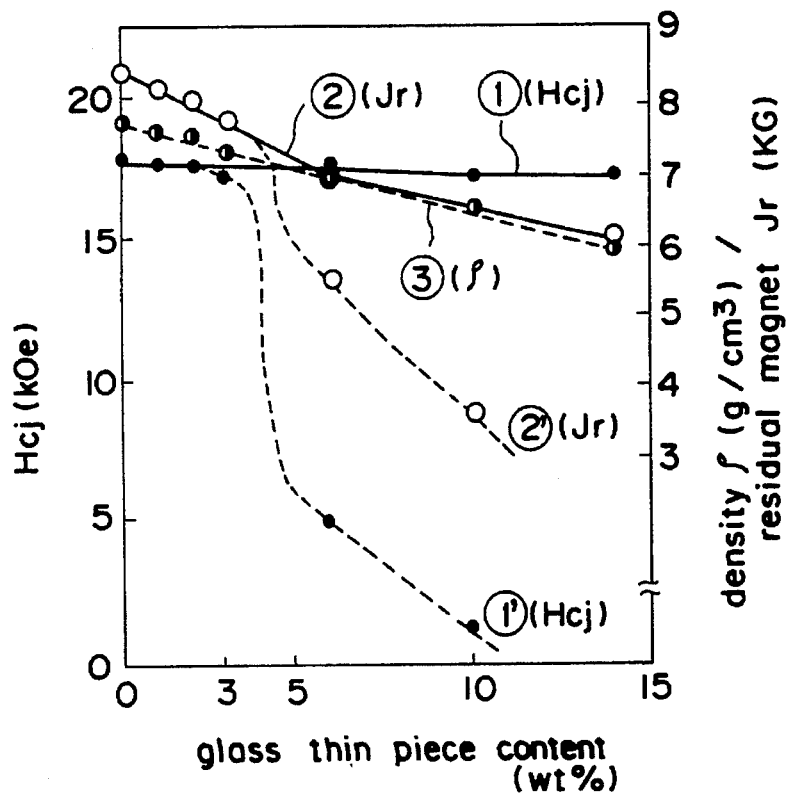
FIG. 4 is a characteristic view showing a glass thin piece including the amount of dependence of Hcj, residual magnetization and density.

FIG. 4 is a characteristic chart showing the relation of the Hcj, 4πIr and density at the 50 kOe pulse magnetization time with respect to the inorganic bonding agent amount (wt %) of the above described inorganic bonding type magnet. Items (1), (2) in FIG. 4 depict a characteristic chart of the current density optimum value at the energizing, sintering time. Items (1'), (2') show a characteristic chart under 300 A/cm² in current density.

The density of the rapidly solidified magnet of inorganic bonding agent amount 14 wt % was 5.96/cm³ with respect to the density 7.65 g/cm³ of the inorganic bonding agent amount 0 wt %. It is equivalent to the volume portion ratio 33% of the inorganic bonding agent, and the gap does not exist. Also, as the density is linearly lowered with increase of the inorganic bonding agent containing amount, the gap does not exist even in the range of 14 wt % or lower in the inorganic bonding agent. The electric insulation is effected with the volume portion ratio equivalent of the inorganic bonding agent.

The resin bonding type rapidly solidified magnet of 6.30 g/cm³ in density is Hcj18.5 kOe, 4πIr6.1 kG, 5.96/cm³ in density, a rapidly solidified magnet of 14 wt % inorganic bonding agent is Hcj17.5 kOe, 4πIr.1 kG. Namely, the rapidly solidified magnet of 14 wt % in the inorganic bonding agent gives 4πIr at the highest level to be obtained by the resin bonding type rapidly solidified magnet, in spite of 94.6% in the density ratio with respect to the above described resin bonding type rapidly solidified magnet. Namely, if the inorganic bonding agent amount is 14 wt % or lower, the rapidly solidified magnet of high 4πIr which is not obtained by the resin bonding type rapidly solidified magnet is now obtained by the change in HcjIkOe. If it is 3 wt % or lower in inorganic bonding agent amount, the energizing, sintering conditions to be represented by the current density can be stabilized, and 4πIr with respect to the resin bonding type rapidly solidified magnet can be increased by 25 to 30%.

Figure 5:
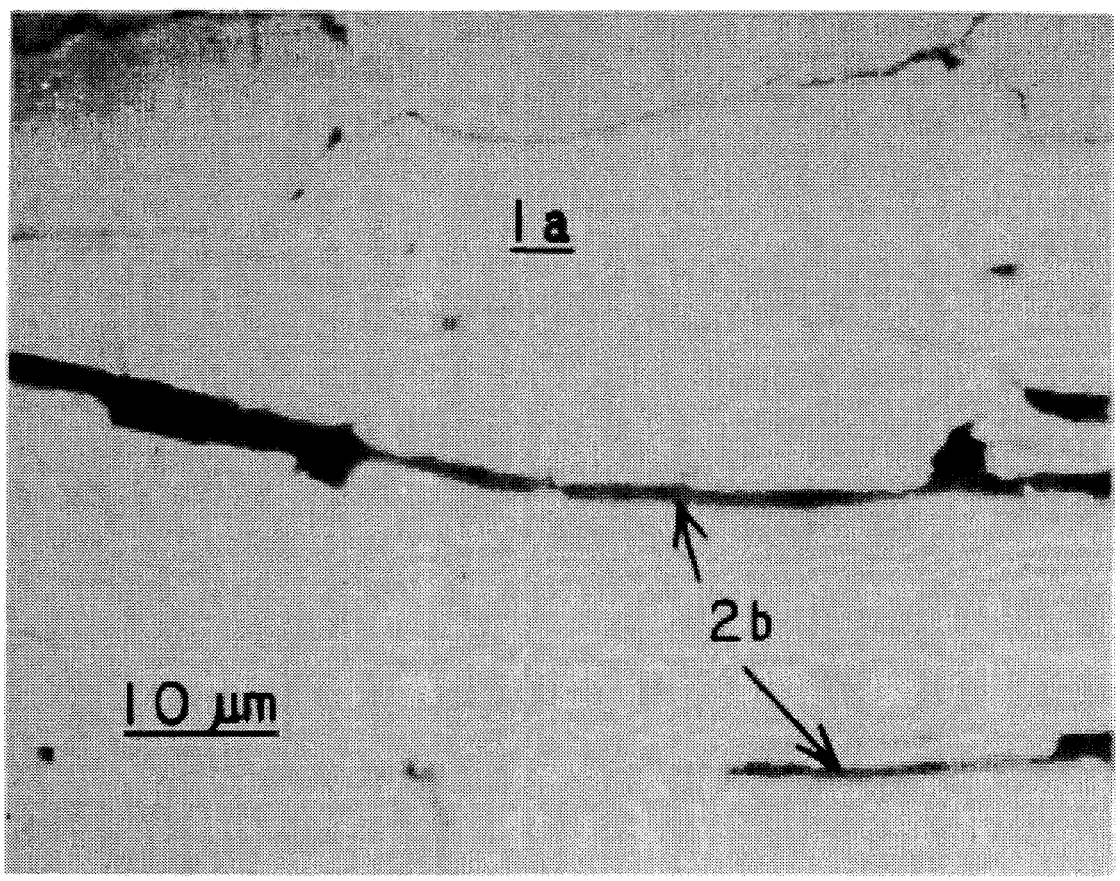
FIG. 5 is a granular construction picture showing organization of a composite magnet.

FIG. 5 is a characteristic view showing the magnet structure on the vertical face with respect to the compression direction of the inorganic bonding agent 1 wt % rapidly solidified magnet. In the drawing, (1) is a fixed rapidly solidified magnet material thin piece, and (2) is an inorganic bonding agent combined with the (1). Construction is assumed with the electric insulating layer being arranged in layer shape in a specific direction like this.

Embodiment 3

A rapidly solidified magnetic powder of 53 to 350 μm was used with indefinite thin strap of 30 μm or so in thickness, being shattered to pieces. The definite thin belt has a mother alloy of $Nd_{13}Fe_{68}Co_{18}B_6$ in alloy structure melt spun.

The mixture ratio between the above described rapidly solidified magnet powder and the inorganic bonding agent was 97 wt % in rapidly solidified magnet powder as a reference. The mixing was effected by a common rule, and three types i.e. (1) direct mixing, (2) mixture drying of slurry, (3) sol gelation reaction were employed.

Glass powder of the $B_2O_3$—PbO—ZnO system, granular diameter 2 to 3 μm was used as inorganic bonding agent in types (1) and (2). The direct mixing of the (1) was effected with a ball mill. In the mixture, drying of the slurry of the (2), first, an inorganic bonding agent 40 weight %, ethylcellulose 10 weight % terpineol 50 weight % are mixed with a ball mill to adjust the slurry. The rapidly solidified magnet powder was added to the slurry and dried at 300° C.

As the inorganic bonding agent from the sol gelation reaction of (3), water/ethanol solution of $SiO_2$—$Bi_2O_3$—$Al_2O_3$—$Li_2O$—$TiO_2$—MgO system metallic alkoxide composition was made. The melt spun powder was added to the solution, was mixed, and dried at 300° C.

The above described inorganic bonding agent/rapidly solidified magnet powders were filled into an energizing, sintering apparatus as described in FIG. 1. The mold was composed of Sialon die of φ55 mm in outside diameter/φ45 mm×70 mm h in inside diameter, a super hardened alloy core (JIS H5501;G9) of φ38 mm×70 mm h in outside diameter, a pair of super hardened alloy electrodes (JIS H5501;G5) of φ45 mm in outside diameter/ φ38 mm×30 mm h in outside diameter.

A pulse current (200 ms On-200 ms Off) was employed to energize the inorganic bonding agent/rapidly solidified magnetic powder through a pair of electrodes, and thereafter a continuous energizing operation was effected to make it minute so as to make a ring shape inorganic bonding type rapidly solidified magnet. The energizing operation is 500 $A/cm^2$ in current density. The magnet had superior size accuracy in outside φ45 mm ±0.01 mm/inside diameter φ38 mm±0.01 mm×23 mm±0.05 mm h.

In the thermal expansion ratio of $12×10^{-6}$, $11×10^{-6}$, $9.8×10^{-6°}$ $C^{-1}$ of the inorganic bonding agent, the thermal stress of the compression energizing process causes cracks in the magnet. Therefore, the thermal expansion ratio in the inorganic bonding agent is desirably $9×10^{-6°}$ $C.^{-1}$ or lower. Hcj at the 50 kOe pulse magnetization time of the above described inorganic bonding type rapidly solidified magnet was 16.0 through 16.5 kOe, 4πIr 7.0 through 7.1 kG, was $10^{-3}$ through $10^{-1}$ Ωcm in electric resistance.

A rapidly solidified magnet which did not include the inorganic bonding agent was 1.30 times in energization time, Hcj at 50 kOe pulse magnetization time was 16.0 through 16.5 kOe, 4πIr 7.3 through 7.4 kG, and $10^{-4}$Ωcm in electric resistance.

A ring-shaped inorganic bonding type rapidly solidified magnet, a rapidly solidified magnet, and a resin bonding type rapidly solidified magnet were respectively assembled with the use of three epoxy resin bonding agents on a core with electromagnet steel plate of φ38 mm in outside diameter/φ12 mm in inside diameter, 0.50 mm in plate thickness being laminated by 138, and thereafter, was inserted in a shaft under pressure so as to provide a ring-shaped magnet rotor with four polarities being magnetized on the outer periphery.

Table 2 shows the resultant voltage of 3000 rpm of a brushless electric motor with the above described ring-shaped magnet rotor being mounted on it, and efficiency of PWM driving. In the inorganic bonding type rapidly solidified magnet in the Table, (1) shows the adjustment between the melt spun powder and the inorganic bonding agent by direct mixture, (2) by mixture drying of slurry and (3) by sol gelation reaction.

TABLE 2

|  | 4π Ir KG | Electric Resistance ω cm | Caused voltage V/3000 rpm | Efficiency % |
|---|---|---|---|---|
| Inorganic bonding type Rapidly solidified magnet |  |  |  |  |
| (1) | 7.1 | $10^{-3}$ | 38 | 81 |
| (2) | 7.1 | $10^{-2}$ | 37 | 83 |
| (3) | 7.0 | $10^{-1}$ | 37 | 87 |
| Comparison Example (1) Rapidly solidified magnet | 7.4 | $10^{-4}$ | 40 | 71 |
| Comparison Example (2) Resin Bonding Type Rapidly solidified magnet | 5.9 | $10^{-1}$ | 32 | 85 |

Although it depends upon the adjusting method and the mixing ratio between the melt spun powder and the inorganic bonding agent, a brushless electric motor of higher output than the resin bonding type rapidly solidified magnet rotor is obtained, and a brushless electric motor of higher efficiency than the rapidly solidified magnet rotor is obtained as is clear from the table.

As is clear from the foregoing description, according to the arrangement of the present invention, a ring shaped inorganic bonding type rapidly solidified magnet can be stably made. Instantaneous mutual attractive force in accordance with the electromagnetic force is applied upon the inorganic bonding agent/rapidly solidified magnetic powder, and thereafter the energizing, sintering operation are effected to provide an inorganic bonding type rapidly solidified magnet. Stable electromagnetic characteristics, electric resistance, size accuracy, mechanical strength are provided. Therefore, it is useful especially as a rotor magnet for an electric motor.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed

1. A method of producing a magnetically isotropic bonded magnet which comprises:

a. providing a cylindrical mold, including a means for subjecting contents of said mold to pressure in an axial direction, means for applying a pulsed direct current to the contents of said mold for energizing said contents and for generating an electromagnetic force in a radial direction in said contents, and means for applying constant direct current to said contents to effect sintering and energizing thereof;

b. filling said cylindrical mold with a mixture of rapidly solidified, melt spun magnetically isotropic magnetic powder and an inorganic glass binding agent therefor;

c. subjecting said mixture in said mold to: i) pressure in an axial direction, ii) a pulsed direct current to energize said mixture and generate an electromagnetic force in a radial direction in said mixture which causes an attractive force between particles of the powder of said mixture and iii) a constant direct current for energizing and heating to effect sintering of said mixture, whereby said magnetically isotropic bonded magnet is produced.

2. The method of claim 1 wherein the inorganic binding agent is made from glass thin pieces.

3. The method according to claim 1, wherein the inorganic binding agent has a thermal expansion ratio of $\leq 9 \times 10^{6}\ °C^{-1}$.

4. The method according to claim 1 wherein the magnetically isotropic bonded magnet has an electric resistance of $10^{-3}$ to $10^{-1}\ \Omega cm$.

\* \* \* \* \*